April 9, 1940.  F. D. SNYDER  2,196,402
MOTOR CONTROL SYSTEM
Filed Aug. 13, 1937  2 Sheets-Sheet 1
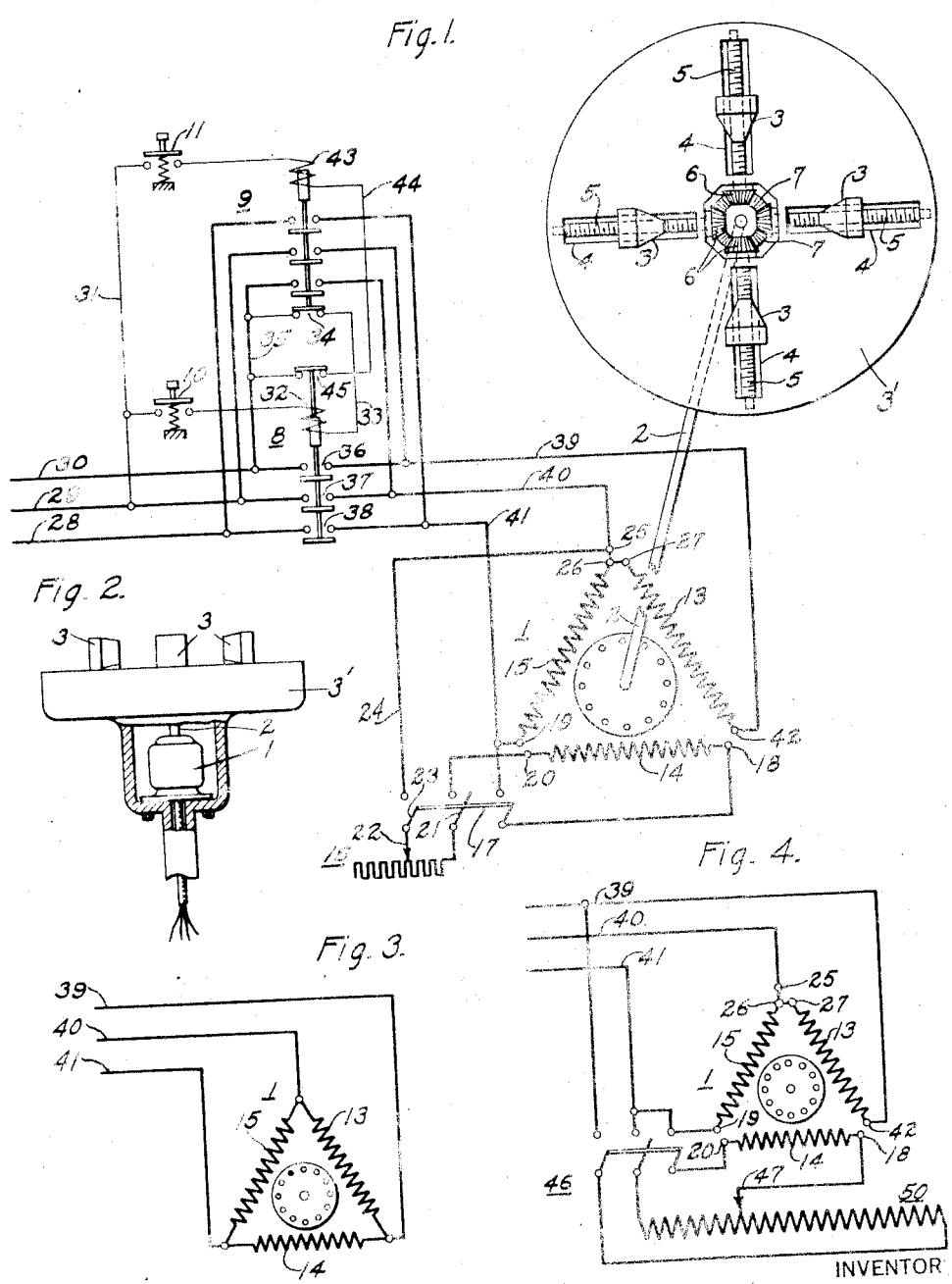
WITNESSES:
INVENTOR
Frederick D. Snyder.
BY
Paul E. Friedeman
ATTORNEY April 9, 1940.                F. D. SNYDER                2,196,402
                            MOTOR CONTROL SYSTEM
                            Filed Aug. 15, 1937           2 Sheets-Sheet 2

WITNESSES:                                                INVENTOR
Leon M. Garman                                     Frederick D. Snyder.
Nur C. Groome                                          BY
                                                   Paul E. Friedemann
                                                        ATTORNEY Patented Apr. 9, 1940

2,196,402

UNITED STATES PATENT OFFICE 2,196,402

MOTOR CONTROL SYSTEM

Frederick D. Snyder, East Milton, Mass., assignor to Westinghouse Electric & Manufacturing Company, East Pittsburgh, Pa., a corporation of Pennsylvania Application August 13, 1937, Serial No. 158,887

12 Claims. (Cl. 172—280)

My invention relates generally to control systems for alternating current motors, and more particularly to systems of control for induction motors.

Induction motors are normally essentially constant speed motors and tend to operate at near synchronous speed. The lower the load the nearer to the synchronous speed will an induction motor operate, or in other words, the speed of an induction motor depends upon its load. At no-load an induction motor may operate at synchronous speed or at least very near its synchronous speed. An induction motor thus normally does not lend itself to slow speed operation at light loads.

One object of my invention is to control the no-load speed of an induction motor.

Another object of my invention is to selectively vary the speed of an induction motor independent of the shaft load on the motor.

A further object of my invention is to provide for operation of an induction motor at any speed from a relatively low speed to near its synchronous speed regardless of the particular load on the motor.

My inventon is not in anywise limited to any particular application, however, to better understand my invention and its objects my systems of control will be discussed in connection with motor driven chucks.

In the operation of the motor driven chuck jaws of a lathe or any other machine using motor driven chucks for gripping a work piece, the motor operating the jaws first operates at substantially no-load and as the material is being gripped the load on the motor increases very rapidly and stalls the motor whereby the work piece is firmly gripped.

Since the motor will be operating at practically no-load just prior to the gripping of the work piece the motor will be operating at near synchronous speed. The energy of rotation of the motor armature will thus be high with the result that the work piece is gripped too firmly and in many cases is damaged. It has been found that the pressure of the chuck jaws on the work piece is primarily determined by the energy of rotation, that is, the inertia of the motor rotor, and is not determined by the motor torque.

In practice, the motor torque is applied to the chuck jaws through an irreversible mechanism so that when the pressure of the jaws is set the motor may be disconnected from the source of electric energy and the jaw pressure will be maintained.

My invention embodies control systems whereby the motor, which may normally be wound for three phase alternating-current service, is operated at any speed below synchronous speed.

To secure the full benefit of my control systems, the motor should be one having a high resistance secondary. The secondary may be either a squirrel cage winding or be of the wound rotor type but the resistance should very preferably be high so that for normal operation the motor will have a speed-torque curve showing stable operation for all loads and showing maximum torque at zero speed.

My systems of control can be used with an induction motor having a pull-out torque, that is, one having an unstable operating range, but in such case my systems must be so adjusted as to control the speed only in the stable range. The control range may thus be very limited. However, with a motor having a steep speed-torque curve and a high starting torque, I can control the speed of the motor from a speed very much lower than synchronous speed up to synchronous speed and such speed control may be effected regardless of the particular shaft load to which the motor may be connected.

A still further object of my invention is to selectively control the speed of a high-resistance secondary induction motor so that any speed from zero speed to the slip speed of the motor for the particular load the motor may be operating may be secured.

Other objects and advantages will become still more apparent from a study of the following specification if considered in conjunction with the drawings accompanying the specification, and in which:

Figure 1 shows diagrammatically an embodiment of my systems of control as applied to a motor driving a chuck;

Fig. 2 is a side view illustrating somewhat diagrammatically a motor and chuck-jaw-carrying table and chuck with parts of the spider, housing, or base for the motor broken away;

Fig. 3 shows diagrammatically the conventional stator or primary connection of a squarrel cage induction motor;

Figs. 4, 5 and 6 are diagrammatic showings of modifications of my control systems.

Figure 5:
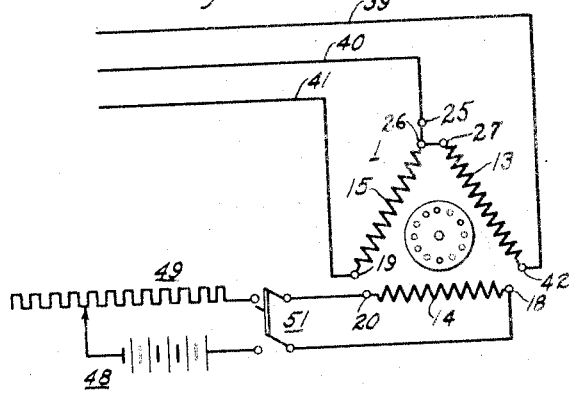

Referring to Figure 1 of the drawings, reference character 1 designates an induction motor which is connected, by shaft 2, to operate the jaws 3 on the face plate 3' of a motor-operated chuck.

The face plate 3' is provided with a plurality of slots 4, within which the chuck jaws 3 are designed to operate. Threaded shafts 5, mounted in suitable bearings in the face plate 3', are each provided with a bevel gear 6. The chuck jaws have threaded engagement with the threaded shafts 5, so that the chuck jaws may be simultaneously moved toward each other or away from each other upon appropriate operation of the shafts. Below the bevel gears 6 is disposed a bevel gear 7. The bevel gear 7 is mounted on the end of shaft 2 and is in operative relation to the bevel gears 6.

From the foregoing description, which is merely illustrative, it will be apparent that rotation of the shaft 2 in one direction moves the chuck jaws away from the central portion of the face plate, and rotation of the shaft in the opposite direction moves the chuck jaws toward the center of the face plate. Furthermore, any pressure exerted on any one or all the chuck jaws will not cause rotation of the shaft 2. That is, the transmission mechanism is irreversible.

The motor is of the reversing type and to accomplish its appropriate reversal, a pair of reversing line contactors 8 and 9 are provided. The actuation of the line contactors may be selectively controlled by a pair of push-button switches 10 and 11.

For normal high speed operation of the induction motor, when my system of control is not used, the primary windings 13, 14 and 15 may be interconnected with the source of electric energy as indicated in Fig. 3, but I prefer to use an open delta connection for normal high speed operation.

To facilitate in the full exploitation of my invention, I use an induction motor having a high resistance secondary and one in which all the leads of the primary windings are brought out of the machine. With the leads thus brought out, the primary windings may be readily connected in open delta and the connection may readily be changed so that the speed of the motor may be controlled.

When a reduced speed is desired, the particular phase winding, as 14 shown in Fig. 1, not used in the open delta connection is connected in series with a variable resistor or rheostat 16 and is connected in parallel with one of the phases of the open delta connection but such parallel connection is arranged to be of opposite polarity. Such connection of winding 14 will produce a flux within the motor which will act as a brake and of course electrically load the other two windings 13 and 15 so that the motor operates at any point on its speed-torque curve. The amount of electric loading may be varied at will by merely changing the amount of braking effect by appropriate adjustment of the rheostat 16.

A still better understanding of my invention can be had by the study of a typical cycle of operation.

Assuming the attendant wishes to place a suitable work piece in the region between the chuck jaws which work piece is to be gripped with a predetermined force. From previous tests or experience the attendant will know just what speed the jaws and thus the motor should have so as to properly grip the work piece with the force desired. The attendant thus adjusts the adjustable portion of the rheostat 16 to the proper position.

Differently sized work pieces of a given material may require different adjustment of the rheostat. The character of the material to be held by the chuck jaws may and usually does also require a different rheostat adjustment.

Once the proper rheostat adjustment has been made, the switch 17 is closed. Closure of this switch connects junction 18 of phase winding 14 to junction 19 of phase winding 15. Junction 19 corresponds in polarity to junction 20 of phase winding 14 and is, therefore, connected to a junction, namely 18 of winding 14 of opposite polarity. Closure of switch 17, on the other hand, connects junction 20 of winding 14, through switch blade 21, the rheostat 16, adjustable lead 22, switch blade 23 and conductor 24 to the junction 25 to which junction the two junctions 26 and 27 of like polarity of the windings 15 and 13, respectively, are connected. From the foregoing explanation, it is apparent that winding 14 is connected in series with the variable rheostat 16 and connected oppositely and in parallel with winding 15.

Assuming that all the mentioned adjustments and connections have been made, that conductors or buses 28, 29 and 30 are suitably energized, and that a work piece is disposed in the region between chuck jaws 3, the attendant depresses push button switch 10 whereby a circuit is established from bus 29, through conductor 31, switch 10, actuating coil 32 of forward line contactor 8, conductor 33, back contactor members 34 of the reverse line contactor 9 and conductor 35 to the bus 30.

Operation of the line contactor 8 causes the closing of the contact members 36, 37 and 38 to thus energize the leads 39, 40 and 41. Lead 39 connects junction 42 of winding 13 to the bus 30, lead 40, interconnects junctions 26 and 27 and, through the rheostat 16, junction 20 to bus 29 and lead 41 connects junction 19 and 18 to bus 28.

The motor will thus operate at a selected speed and, when the work piece is engaged by the jaws, expend its energy of rotation to grip the work piece with a predetermined force. As soon as the motor stalls the switch 10 is released and, since the jaws are operated through an irreversible mechanism, the work piece is firmly held even though the motor is disconnected from the buses 28, 29 and 30.

After the work piece has been operated upon, or has been reduced to a finished article, the attendant actuates push button switch 11 to thus establish a circuit from bus 29, through conductor 31, push button switch 11, actuating coil 43 of line contactor 9, conductor 44, back contacts 45 of the line switch 8, and conductor 35 to the bus 30. Operation of the line contactor 9 connects the motor 1 for reverse operation whereby the jaws are moved away from each other to release the work piece.

In the modification shown in Fig. 4 the open delta connection is exactly as shown in Fig. 1 but the speed control is accomplished somewhat differently. For the speed control shown in Fig. 4, I use an auto-transformer 50 having its terminals connected to leads 39 and 41, respectively. The switch 46 also connects junctions 19 and 20 together and to lead 41 but the adjacent junctions 18 and 42 of the windings 13 and 14 remain on open circuit.

The auto-transformer 50 has as many taps as desired from zero voltage to its full voltage and a shiftable lead 47 connected to junction 18 may be connected to any one of the transformer taps whereby the winding 14 may be energized a variable amount. Shifting the lead to the left on the taps changes the speed to the lowest motor speed whereby shifting the lead to the right increases the speed. When the lead is at the extreme right, the motor is connected to the source of energy in delta, as shown in Fig. 3, and the motor will have some relatively high and substantially constant speed determined by the motor load.

Figure 6:
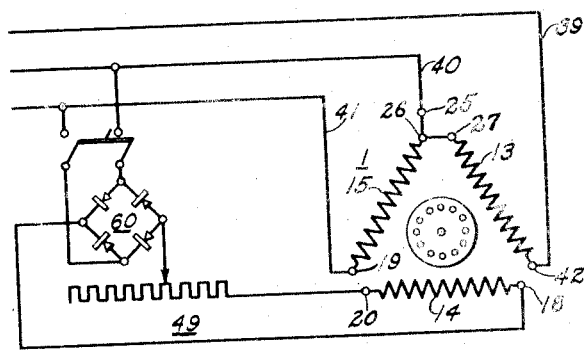
Figure 7:
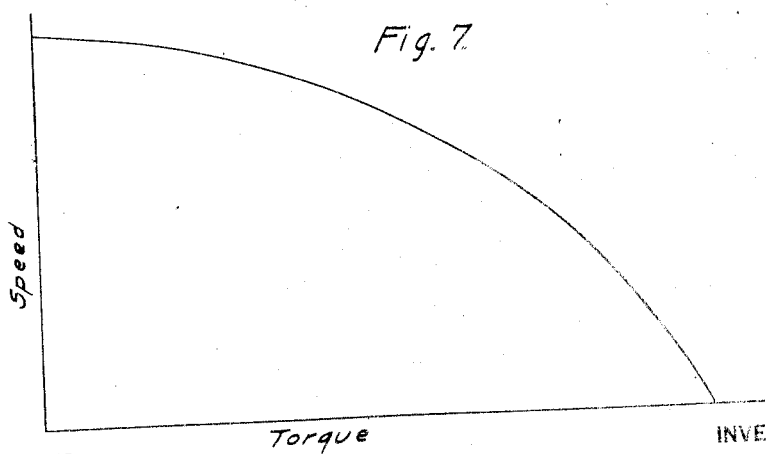
Fig. 7 shows the speed-torque curve of a high-resistance secondary induction motor.

The electrical braking of the induction motor may also be accomplished by the use of direct current supplied to the unused phase winding of an open delta connection. Figs. 5 and 6 illustrate this type of connection.

Where a source of direct current 48, as a battery or direct current generator, is readily available the connection may be made as indicated in Fig. 5. In this figure, reference character 48 represents a source of direct current and reference character 49 represents a rheostat for varying the electric braking effect. When switch 51 is open, the motor may be operated at normal speed on an open delta connection. When switch 51 is closed, the electric braking circuit is connected in the primary winding 14.

When no source of direct current is readily available, a rectifier 60 as shown in Fig. 6 may be used. This rectifier may be a full wave rectifier as shown or a half wave rectifier may be used.

Fig. 2 shows somewhat diagrammatically how the motor may be mounted in relation to the face plate 3' and how the motor shaft is connected directly to the chuck jaw operating mechanisms. The details of the motor mounting do not constitute a part of my invention and Fig. 2 is merely shown to supplement to some extent the very diagrammatic showing of Fig. 1.

My invention is, of course, not limited to any particular application and my systems of control are shown applied to a chuck only to aid in disclosing my invention.

I am, of course, aware of the possibility that others, especially after having had the benefit of the teachings of my disclosure, may devise other similar and other possibly dissimilar control apparatus for controlling the speed of an induction motor. I, therefore, do not wish to be limited to the particular systems of control disclosed but wish to be limited only by the scope of the claims hereto appended and by such prior art as may be pertinent.

I claim as my invention:

1. In a system of control for induction motors, in combination, an induction motor having three phase primary windings, a source of three phase alternating current, means adapted to connect two of the phases of said primary windings in open-delta connection to said source of alternating current, and means for directly energizing the remaining phase of the primary windings from said source of alternating current so as to produce an eltromagnetic effect in opposition to the electromagnetic effect of the two phase windings connected to the source of alternating current in open delta connection to thus control the continuous speed of the motor.

2. In a system of control for induction motors, in combination, an induction motor having three phase primary windings, a source of three phase alternating current, means adapted to connect two of the phases of said primary windings in open-delta connection to said source of alternating current, means for connecting the remaining phase across said source of alternating current for so directly energizing the remaining phase of the primary windings as to produce an electromagnetic effect in opposition to the electromagnetic effect of the two phase windings connected to the source of alternating current in open delta connection and means for varying the energization of the said remaining phase of said primary winding.

3. In a system of control for induction motors, in combination, an induction motor having three phase primary windings and a high resistance secondary winding, a source of three phase alternating current, means adapted to connect two of the phases of said primary windings in open delta connection to said source of alternating current, and a source of electric energy for energizing the remaining phase of the primary windings so as to produce an electromagnetic effect in opposition to the electromagnetic effect of the phase windings connected to the source of alternating current in open delta connection.

4. In a system of control for induction motors, in combination, an induction motor having three phase primary windings and high resistance secondary windings, a source of three phase alternating current, means adapted to connect two of the phases of said primary windings in open-delta connection to said source of alternating current, means for energizing the remaining phase of the primary windings directly from said source of alternating current so as to produce an electromagnetic effect in opposition to the electromagnetic effect of the two phase windings connected to the source of alternating current in open delta connection and means for varying the energization of the said remaining phase of said primary winding.

5. In a system of control for induction motors, in combination, an induction motor having three phase primary windings, a source of three phase alternating current, switching means adapted to connect two of the phases of said primary windings in open delta connection to said three-phase source of alternating current, and other switching means including circuit arrangements adapted to interconnect the remaining phase of the primary windings with said three-phase source of alternating current and also in parallel with one of the phase windings of said open-delta connected primary windings, said interconnection of the remaining primary windings being such that the effect of the remaining primary winding is in electromagnetic opposition to the effect of the open-delta connected primary windings.

6. In a system of control for induction motors, in combination, an induction motor having three phase primary windings, a source of three phase alternating current, switching means adapted to connect two of the phases of said primary windings in open delta connection to said three-phase source of alternating current, other switching means including circuit arrangements adapted to interconnect the remaining phase of the primary windings with said three-phase source of alternating current and also in parallel with one of the phase windings of said open-delta connected primary windings, said interconnection being such that the electromagnetic effect is in opposition to the electromagnetic effect of the open-delta connected primary windings, and means included in said circuit arrangements adapted to vary the energization and thus the opposing electromagnetic effect of the primary winding controlled in its connection by said other switching means against the electromagnetic effect produced by said open-delta connected primary windings.

7. In a system of control for induction motors, in combination, an induction motor having three phase primary windings, and high resistance secondary windings, a source of three phase alternating current, switching means adapted to connect two of the phases of said primary windings in open delta connection to said three-phase source of alternating current, and other switching means including circuit arrangements adapted to interconnect the remaining phase of the primary windings with said three-phase source of alternating current and also in parallel with one of the phase windings of said open-delta connected primary windings, said connection being such that the effect of the windings of the remaining phase is in electromagnetic opposition to the effect of the open-delta connected primary windings.

8. In a system of control for induction motors, in combination, an induction motor having three phase primary windings and high resistance secondary windings, a source of three phase alternating current, switching means adapted to connect two of the phases of said primary windings in open delta connection to said three-phase source of alternating current, other switching means including circuit arrangements adapted to interconnect the remaining phase of the primary windings with said three-phase source of alternating current and also in parallel with one of the phase windings of said open-delta connected primary windings, said connection being such that the effect of the windings of the remaining phase is in electromagnetic opposition to the effect of the open-delta connected primary windings, and means included in said circuit arrangements adapted to vary the energization and thus the opposing electromagnetic effect of the primary winding, controlled in its connection by said other switching means, against the electromagnetic effect produced by said open-delta connected primary windings.

9. In a system of control for induction motors, in combination, an induction motor having three phase primary windings, a source of three phase alternating current, switching means including circuit arrangements adapted to connect two of the phases of the primary windings in open-delta connection to said three phase source of alternating current, and means for connecting the third phase of the primary windings in parallel with one of the two primary windings connected in open delta connection but connected in opposition thereto.

10. In a system of control for induction motors, in combination, an induction motor having three phase primary windings, a source of three phase alternating current, switching means including circuit arrangements adapted to connect two of the phases of the primary windings in open-delta connection to said three phase source of alternating current, means for connecting the third phase of the primary windings in parallel with one of the two primary windings connected in open-delta connection but connected in opposition thereto, and a variable resistor connected in series with the said third phase primary winding.

11. In a system of control for induction motors, in combination, an induction motor having three phase primary windings, and high resistance secondary windings, a source of three phase alternating current, switching means including circuit arrangements adapted to connect two of the phases of the primary windings in open-delta connection to said three phase source of alternating current, and means for connecting the third phase of the primary windings in parallel with one of the two primary windings connected in open-delta connection but connected in opposition thereto.

12. In a system of control for induction motors, in combination, an induction motor having three phase primary windings and high resistance secondary windings, a source of three phase alternating current, switching means including circuit arrangements adapted to connect two of the phases of the primary windings in open-delta connection to said three phase source of alternating current, means for connecting the third phase of the primary windings in parallel with one of the two primary windings connected in open-delta connection but connected in opposition thereto and a variable resistor connected in series with the said third phase primary winding.

FREDERICK D. SNYDER.